Dec. 26, 1939.  C. A. BREWER  2,184,732
VACUUM CLEANER
Filed June 11, 1936    4 Sheets-Sheet 1

INVENTOR.
BY Charles A. Brewer
F. Bascom Smith
ATTORNEY.

Dec. 26, 1939.   C. A. BREWER   2,184,732
VACUUM CLEANER
Filed June 11, 1936   4 Sheets-Sheet 3

INVENTOR.
BY Charles A. Brewer
F. Bascom Smith
ATTORNEY.

Dec. 26, 1939.  C. A. BREWER  2,184,732
VACUUM CLEANER
Filed June 11, 1936  4 Sheets-Sheet 4

INVENTOR.
BY Charles A. Brewer
F. Bascom Smith
ATTORNEY.

Patented Dec. 26, 1939

2,184,732

UNITED STATES PATENT OFFICE 2,184,732

VACUUM CLEANER

Charles A. Brewer, Noroton Heights, Conn., assignor to Bendix Products Corporation, South Bend, Ind., a corporation of Indiana Application June 11, 1936, Serial No. 84,624

5 Claims. (Cl. 183—7)

This invention relates to means for separating dust particles from air and more particularly to vacuum cleaning apparatus embodying such means and adapted for removing dirt and other foreign matter from floors, rugs, upholstered furniture, and the like.

In substantially all vacuum cleaners being made and sold today, dust-laden air is directed through a finely perforated cloth or paper, and said perforated member constitutes the sole means for separating dirt and dust from the air. The air is ordinarily drawn into the cleaner or driven therefrom through said separator at high velocities by a motor driven fan and consequently large quantities of minute dust particles are carried through the separator back into the room. These particles settle upon the furniture, walls, etc., thus scattering bacteria picked up from the floors and rugs to the four corners of the room and polluting the air, thereby impairing the health of the occupants who must breathe the same.

Additionally, the perforated member, if the same is of sufficiently fine mesh to operate in any satisfactory degree as a dust separator, offers considerable resistance to the passage of air, thereby causing a substantial back pressure to build up against the suction fan and reduce the effectiveness thereof, or, in cleaners wherein the separator is placed between the fan and the suction nozzle, to materially reduce the effective suction at the nozzle or floor tool. The efficiency of cleaners of the above type is decreased even more by the fact that many dirt particles adhere to the separator, clogging the perforations and enhancing the resistance to passage of air therethrough.

It is accordingly an object of the present invention to provide novel air cleaning means adapted for use in a vacuum cleaner wherein the foregoing objections and disadvantages are overcome.

Another object of the invention is to provide a novel method for separating dirt particles from air and further to provide novel apparatus for carrying out said method, the latter being particularly adapted for separating extremely fine dust particles, hair, lint, etc., from a gaseous medium.

Still another object is to provide a novel vacuum cleaner in which the larger dirt particles are separated from the air by minimizing the air velocity and directing the air through a tortuous path.

A further object is to provide a novel vacuum cleaner which is so constructed that the accumulated dirt therein will not be continuously agitated by the incoming or outgoing air.

A still further object is to provide a novel vacuum cleaner which may be readily and inexpensively constructed into a light weight compact unit having a neat appearance and one which is adapted to be used either in connection with a detachable hose and nozzle or as a mobile unit with nozzle attached.

Another object is to provide novel means for coupling the flexible hose of a floor tube to a vacuum cleaner whereby the hose and nozzle are free to turn relative to the cleaner unit.

Another object is to provide novel cover means for a dust receptacle of a vacuum cleaner whereby disposal of accumulated dirt is facilitated.

It is also an object of the invention to provide novel apparatus for preventing the accumulation of excessive quantities of dirt particles on a perforated air and dust separator.

Another object is to provide an inexpensive and readily removable and renewable air strainer or dust separator in a vacuum cleaner which may be treated with a suitable antiseptic or germicide for the purpose of destroying bacteria and purifying the air as the same passes from the cleaner back into the room.

The above and further objects and novel features of the invention will more fully appear from the following detail description when taken in connection with the accompanying drawings. It is to be expressly understood, however, that the drawings are for the purpose of illustration only and are not designed as a definition of the limits of the invention, reference being primarily had for this latter purpose to the appended claims.

In the drawings, wherein like reference characters refer to like parts throughout the several views, Fig. 1 is a side elevation, partly in section, of one form of vacuum cleaner embodying the present invention, the section being taken substantially on line 1—1 of Fig. 2;

In the accompanying drawings the present invention is illustrated, by way of example, in the form of a vacuum cleaner of the type commonly used for cleaning floors, rugs, furniture, and the like, but it will be apparent that the novel method and means employed for separating dust particles from air or other foreign matter from a gaseous medium are adapted for use in other types of apparatus wherein it is desired to clean air or other gases. In the vacuum cleaner illustrated dust-laden air, which is drawn into the cleaner by a motor driven fan is first directed against a plurality of baffles and subjected to a number of sharp changes of course in a compartment wherein the velocity of the air is substantially decreased as compared with the velocity with which the same is projected from the fan blades. The larger dirt particles are thus deposited in a suitable receptacle by gravitation and the partially cleaned air is directed along an upward tortuous path in close contact with a plurality of electro-statically charged plates. Said plates being so charged have an attraction for the minute dust particles, hair, lint, etc., drawn into the cleaner by the suction of the motor driven fan. For further assurance that the air will be thoroughly cleaned before being discharged into the room the same is preferably directed through a screen which may be of a comparatively coarse weave so as to offer little or no resistance to the passage of air therethrough. Said screen may be treated with a suitable antiseptic or germicide for the purpose of destroying any bacteria which may be entrained in the air.

Figure 5:
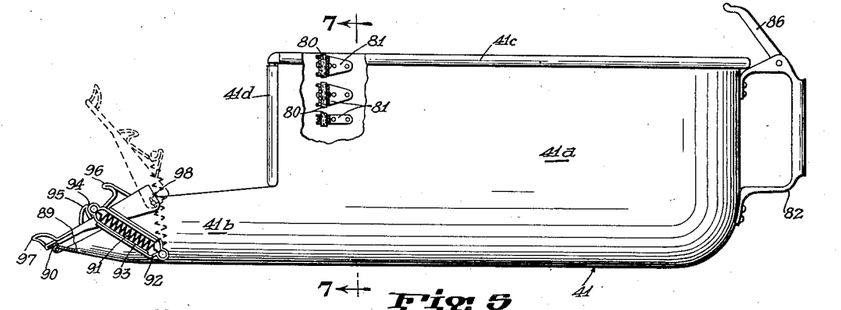
Fig. 5 is a detail view showing the novel dirt receptacle employed in the embodiment of Fig. 1, the view being a side elevation, partly in section and with parts broken away.
Figure 6:
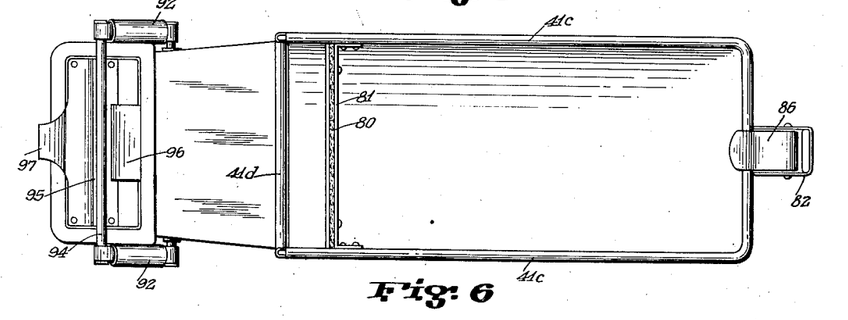
Fig. 6 is a top plan view of the receptacle of Fig. 5.
Figures 7, 8:
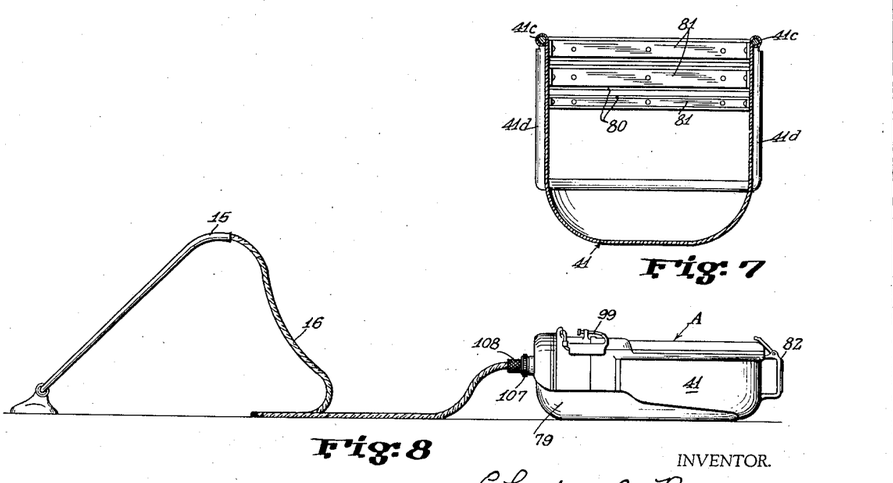
Fig. 7 is a section taken on line 7—7 of Fig. 5.
Fig. 8 is a miniature view showing the cleaner unit of Fig. 1 attached to a floor tool.

One form of novel apparatus for carrying out the invention is illustrated in Figs. 1 to 8 inclusive as constituting a light, compact vacuum cleaner unit A, Fig. 8, to which a floor tool 15 may be connected by means of a long flexible hose 16 thereby rendering it unnecessary to continuously move the entire unit about the room while cleaning a rug or other article. Cleaning unit A as shown comprises an electric motor encased in a housing 17 (Fig. 1), the armature shaft 18 of said motor being horizontally disposed and the field windings thereof being connected by any suitable well-known means (not shown) to an appropriate source of electric energy. A fan housing 19 is secured to the forward end of motor housing 17 by means of studs 20 and a suction fan 21 is mounted therein on an extended portion of motor shaft 18 for rotation therewith. Said fan is adapted when rotated to draw air and dirt through a central flanged opening 23 and floor tool 15, 16 (Fig. 8).

For a purpose to be more fully described hereafter, housings 17 and 19 are preferably provided with cored passages 24 and 25 respectively at the tops thereof, said passages cooperating to form a continuous passage that terminates in the central or suction area of the fan housing. Said housings also have hollow depending portions cast integrally therewith which cooperate to form a passage 26 extending from the periphery of the fan chamber of housing 19 to the rear of housing 17 for the purpose of directing dust-laden air from the fan housing to a suitable dirt receptacle. Passage 26 is preferably round adjacent the fan housing and changes to a rectangular cross-section of greater area at the rear edge of the motor housing. By thus increasing the area of passage 26 a substantial reduction in the velocity of the air is obtained.

A rear cover for housing 17 comprising a dome-shaped member 27 and the forward wall of a sheet metal housing member 28 is secured thereto by a plurality of stud bolts 29. The closure wall of said housing member is provided with an opening which coincides with passage 24, 25 and a flanged rectangular opening 30 which constitutes a continuation of passage 26. Said housing member is also provided with a rearwardly extending lower wall 28a and side walls formed integrally with and extending upwardly from said lower wall. The rear edges of said lower and side walls of housing member 28 are faced or lined with a strip 31 of resilient material, such as rubber composition, for a purpose to appear hereafter, said strip being held in place by an angular metallic member 32 which may be soldered or otherwise suitably secured to said walls.

In accordance with the novel method comprehended by the present invention the heavier particles of dirt are preferably separated from the incoming dust-laden air by a combination of centrifugal and gravitational forces and, for the purpose of carrying out this step of the method, a novel baffle box 33 is provided. Said box, in the form shown, is fabricated from a plurality of sheet metal stampings and is of substantially rectangular cross section both longitudinally and laterally, an open end of said box having a telescopic fit with the rearwardly extending flange of opening 30. Box 33 is supported as a cantilever by means of a plurality of bolts 34, 34' which extend through the upper wall thereof and through suitable openings in a shelf 35 which is cast integrally with and extends rearwardly from the lower edge of cover member 27. A plurality of depending ribs or baffles 36, 37 and 38 are formed in the upper portion of box 33 by pressing the upper wall thereof inwardly, said baffles extending substantially the entire width of said box. The forward walls of baffles 36 and 37 are straight and extend rearwardly and downwardly in order to direct the air currents or at least part of them through openings 39 and 40, respectively, in the lower wall of box 33 and against downwardly and forwardly extending lips 39a and 40a adjacent said openings and thence into a dust pan 41, the construction of which will be fully described hereafter. The forward wall of baffle 38 is curved for the purpose of imparting a whirling motion to the air currents striking the same and directing said currents through an opening 42 in the lower surface of box 33. An arcuate lip 42a extends downwardly from the after edge of opening 42 and constitutes a continuation of the arc of the forward wall of baffle 38. The angular end wall of box 33 directs the remaining air currents downwardly through an opening 43 and against a forwardly extending lip 43a. A pair of laterally and upwardly extending baffles 40b and 42b may be provided at the forward edges of openings 40 and 42, respectively, for directing the air currents upwardly against baffles 37 and 38. A downwardly extending lip at the forward end of opening 39 is adapted to engage the upper surface of member 32. The velocity of the air as it passes into the large dirt receptacle 41 is not only materially reduced, thereby causing the larger dirt particles to settle therein by force of gravitation, but the air currents are subjected to sharp reversals of course by the baffle arrangement in box 33, thereby rendering it difficult for the heavier dirt particles to remain suspended in the air. Additionally, air currents which reach opening 42 are subjected to a whirling motion by baffle 38 and lip 42b, thereby causing the heavier particles to be separated therefrom and deposited in receptacle 41 by centrifugal action.

As pointed out above, vacuum cleaners heretofore provided have not been equipped with any means for satisfactorily removing fine dust particles from the air, said particles being carried through the perforated separator and back into the room in which the cleaner is being operated. In order to obviate this disadvantage of prior cleaners, the present invention comprehends a novel method and means for separating all fine dust particles, hair, lint, etc., from the air without affecting the efficiency of the suction means heretofore described by the creation of a back pressure or by increasing the required suction necessary for proper cleaning of the rug or other article being cleaned. Said method comprises directing the slowly moving air from the lower portion of receptacle 41 over an upwardly winding path in close contact with a plurality of electro-statically charged surfaces.

Figure 2:
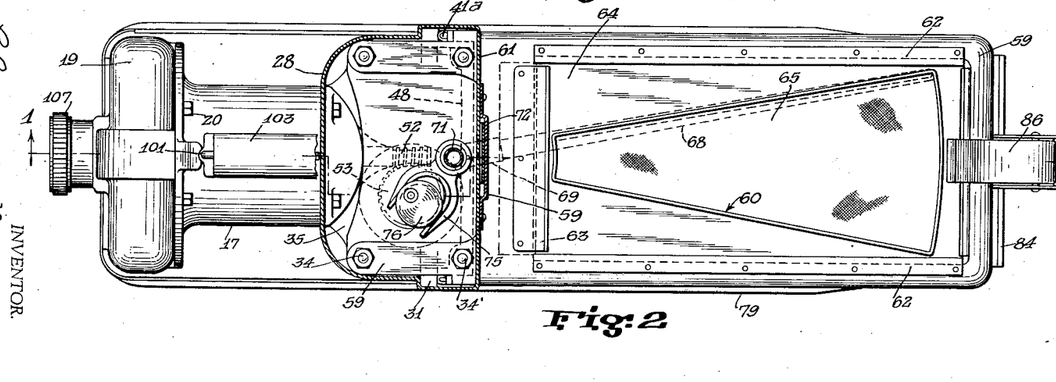
Fig. 2 is a top plan, partly in section and with cover removed, the section being taken substantially on line 2—2 of Fig. 1.

In the illustrated embodiment said path is defined and said surfaces provided by three rectangularly shaped plates 44, 45 and 46, said plates being made of any suitable material, such as celluloid, amber, hard rubber, etc., which may be statically charged and being mounted in cantilever fashion with shelf 35 as a support by means of bolts 34, 34' which extend through openings adjacent the sides of said plates at the forward ends thereof. Said plates are vertically spaced and insulated from one another by means of suitable spacing sleeves 47 surrounding bolts 34 and by channel shaped partition members 48 having bosses at the corners thereof through which bolts 34' extend. The side walls of members 48 extend forwardly and cooperate as seen in Fig. 2 in holding packing strip 31 in position against the side walls of housing member 28. All three of the plates 44, 45 and 46 extend substantially the entire width of receptacle 41, the edges thereof being padded with strips 49 (Fig. 4) of felt or other suitable material which engage the side walls of said receptacle and prevent the passage of air thereby. Sealing members 49 are preferably secured in place by pairs of flat strips 50 which may be secured to plates 44, 45 and 46 in any suitable manner or placed thereon while said plates are being molded. A similar sealing strip 49' is provided across the outer end of plate 45 and is adapted to engage the end wall of receptacle 41 whereas plates 44 and 46 are somewhat shorter to thereby provide air passages between the ends thereof and the end wall of said receptacle. The lower surface of plate 44 engages an up-turned flange 33a extending around three sides of box 33 and is insulated therefrom by means of member 50 which has a U-shaped portion extending across the outer end of said plate. The compartments between the electro-statically charged plates are joined by an opening 51 in plate 45 and the upper of said compartments is preferably larger than the lower to provide a reduced air velocity in the former.

Novel means are provided for the purpose of creating and maintaining a static charge on plates 44 to 46 to render the same capable of attracting and removing fine dust particles and other foreign matter from the air, said means, in the form shown, being supported by shelf 35 and housed within the space defined by said shelf, the walls of housing member 28 and partition members 48. Said static creating means is preferably driven by the fan motor, the rearwardly extending worm shaft 52 of said motor having engagement with a worm gear 53 which is keyed to a rotatably mounted vertical shaft 54 that freely extends through openings in plates 44 and 46 and has the lower end thereof journalled in shelf 35. Keyed to said shaft above each of the static plates is a laminated disc comprising a weighted portion 55 and a portion 56 made of any suitable material, such as felt, flannel or the like, which when moved in frictional contact with said plates will create a static charge on the latter. Said discs are preferably keyed to shaft 54 for free longitudinal movement thereon so that the lower surfaces 56 of said discs will contact plates 44 and 46 irrespective of wear and without the necessity for adjustment.

It is well known that any substance may be electrified by frictional contact with a dissimilar substance, said frictional contact creating a positive static charge on one of said members and an equal negative static charge on the other. For example, when a rubber rod is stroked with cat's fur a certain amount of negative electricity appears upon the rubber rod, whereas an equal amount of positive electricity is developed on the cat's fur. Likewise, when a glass rod is rubbed with silk, the silk acquires a negative charge and the glass rod an equal positive charge. Frictional contact between a body of sealing wax and a piece of flannel creates a negative charge on the wax and a positive charge on the flannel. It will accordingly be understood that the friction faces of discs 55, 56 and the composition of plates 44 to 46 may vary widely and that, if desired, each disc and plate set may be constituted by different materials so that one or more of the plates will be charged positively at the same time that the others are charged negatively, thereby insuring that all particles of foreign matter will be removed from the air passing in proximity to the charged surfaces.

From the compartment between the plates 45 and 46 the cleaned air passes slowly around the outer end of the upper of said plates and thence forwardly of the cleaner in a compartment formed by plate 46 and the base of a trough or box 57 which has an upwardly extending flange 57a on both sides and at the outer or rear end thereof. Said trough is mounted on bolts 34, 34' and spaced from plate 46 in precisely the same manner that plates 45 and 46 are mounted and spaced from one another. An opening having a suitable bushing therein is provided in the lower surface of trough 57 for journalling the upper end of shaft 54 which extends therethrough. An opening 58 is also provided in the bottom of trough 57 for the passage of air from compartment 46, 57.

In order to further insure the cleanliness of the air which passes from the cleaner into the room and for the purpose of purifying the same by destroying any bacteria carried thereby, a novel cover comprising a perforated separator through which the air must pass is provided for box 57. As shown, said cover comprises a sheet metal member 59 which has a centrally disposed, triangularly shaped opening 60 therein and is secured to flange 57a by interlocking the edges thereof in a manner to appear hereafter. A pair of inwardly bent tongues or arms forming a part of housing member 28 constitute a transverse partition member 61 and the central forward end of cover 59 is secured thereto by any suitable means, such as rivets. Partition or wall 61 also constitutes the forward end of the air compartment in box 57. That portion of cover 59 which extends forwardly of wall 61 is bifurcated and is provided with openings for bolts 34, 34', the holding nuts threaded on the upper ends of said bolts engaging the upper surfaces of said bifurcated portions.

Figure 4:
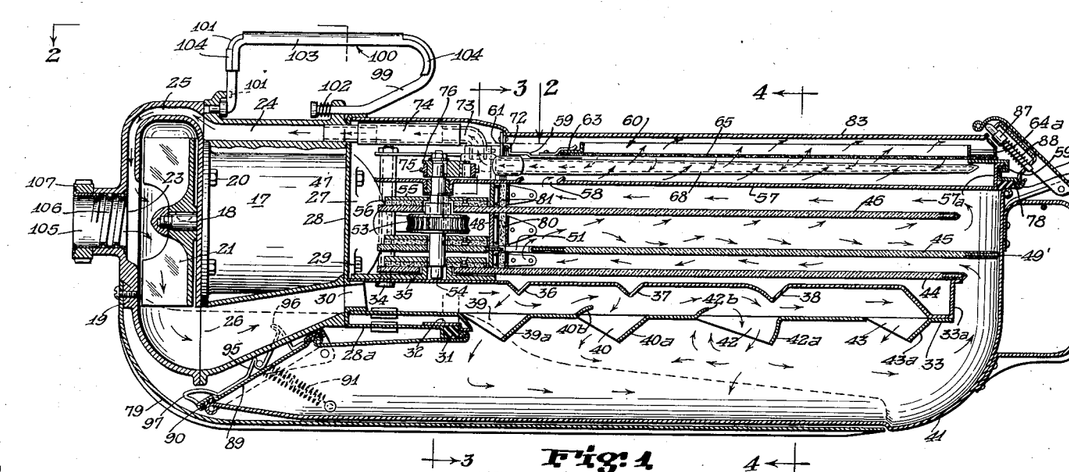
Fig. 4 is a similar view, taken on line 4—4 of Fig. 1.

The upper surface of cover 59 has a pair of longitudinally extending angle strips 62 and a similar transverse strip 63 secured adjacent the forward end of opening 60 for the purpose of removably holding a perforated separator in place over said opening so that the same may be readily removed and renewed. The novel separator illustrated is one which may be readily and inexpensively manufactured, the same comprising a thin sheet metal plate 64 having an opening therein adapted to coincide with opening 60 in plate 59, and a coarsely woven cloth member 65. Said cloth member preferably extends across the lower face of plate 64, the outer edges thereof being doubled back over the upper surface of the plate for a short distance and held in place under slight tension by channel-shaped crimping members 67, as best seen in Fig. 4. Said channel-shaped crimping members also constitute track means adapted to engage the channels formed between plate 59 and the upwardly extending angular portions of members 62, whereby the separator may be readily moved into and out of operative position. An upturned flange 64a may be provided at the outer end of plate 64 to constitute a handle for facilitating the removal and insertion of separator 64, 65. Member 65 may, of course, be made of any suitable perforated material and is preferably impregnated with an antiseptic, germicide, or disinfectant for purifying the air which passes therethrough and out into the room.

As was heretofore pointed out, one of the disadvantages in vacuum cleaners now in use resides in the fact that dirt and other foreign matter clings to the perforated separator, thereby clogging the same and accordingly reducing the efficiency of the suction fan either by creating a back pressure or by increasing the required suction for pulling air through the separator, depending on the position of the separator relative to the suction fan. Novel means are provided in the cleaner of the present invention for preventing excessive accumulation of dirt on the separator and in the perforations of the same, thereby obviating the above objections to prior cleaners. Said means in the illustrated embodiment comprises a hollow arm 68 having a longitudinally extending slot in the upper side thereof which side is adjacent the lower surface of separator 65. By creating a suction within arm 68 and angularly reciprocating the arm across the lower surface of the separator in a manner to be hereinafter described, any dust particles which are intercepted by separator 65 and which adhere thereto are promptly drawn back into the cleaning unit by the suction of fan 21.

Preferably arm 68 is mounted with one end thereof having a close telescopic fit in a radially extending portion 69 of a cylindrical hub 70 (Fig. 3) that is rotatably mounted on a hollow stud 71 which is in turn rigidly secured to the base of box 57 forwardly of wall 61, the latter being provided with an elongated slot to permit angular reciprocation of arm 68, 69 about pivot 71. A plate member 72 (Fig. 2), which is slidably mounted with respect to wall 61, may be provided on arm portion 69 for covering said slot irrespective of the position of arm 68. The hollow center of said arm has communication through portion 69, the hollow center of stud 71, an elbow 73 fitted into said stud, a removable connecting conduit 74, and passage 24, 25 with the center or suction chamber of fan housing 19. Thus, when the cleaner is in operation a strong suction is created within arm 68 for removing any particles from separator 65 which may accumulate thereon. Additionally, the suction at the mouth of arm 68 assists in preventing the building up of any detrimental back pressure against the discharge of fan 21.

For the purpose of reciprocating arm 68 in the desired manner, a fork or yolk 75 (Fig. 2) is formed integrally with or is rigidly secured to hub 70 and engages the periphery of a disc 76 which is eccentrically mounted on shaft 54 for rotation therewith. Accordingly upon operation of the fan motor, shaft 54 is driven through worm 52 and worm gear 53 to thereby rotate disc 76 and render the same effective through yolk 75 to angularly reciprocate arm 68, 69 sufficiently to cause the slotted portion thereof to sweep across separator 65 which covers openings 60.

In order that the dust and other foreign matter which is accumulated by the cleaning unit will not be continually agitated by the incoming air, a novelly constructed dust receptacle is provided. As illustrated said receptacle comprises a portion 41a (Fig. 5) which constitutes a housing for plates 44 to 46 and baffle box 33, and a reduced portion 41b into which dirt is adapted to be driven by the air currents which are directed forwardly by lips 39a, 40a, 42a and 43a. The upper and forward edges of portion 41a are preferably rolled outwardly around a heavy wire to form a guide 41c which is adapted to slide in a track formed by a depending portion of a bracket 77 (Figs. 4 and 5) which extends around the sides and end of box 57. Said bracket is held in place by occasional rivets (not shown) which extend through the walls of flange 57a and by cover plate 59, the edges of which are turned downwardly and inwardly over small external flanges on said box and bracket 77. A strip of suitable resilient material 78, such as rubber composition for example, is held in place by bracket 77 for engagement by the upper edge of head 41c. Strip 78 forms a continuation of strip 31 which is adapted to be engaged by rib or head 41d formed at the forward end of portion 41a of pan 41.

For the purpose of holding pan 41 in firm, substantially air-tight engagement with strip 78 and to provide a support for the cleaning unit when said pan is removed, as well as means whereby the cleaner may be freeely moved about, a runner 79 is secured to housing 17, 19 by means of screws or other suitable means and extends rearwardly sufficiently far to support the cleaner against longitudinal tipping when pan 41 is withdrawn for emptying. Runner 79 is preferably shaped so as to carry out the general lines of the cleaner and thus contribute to the neat appearance of the same, the base thereof being somewhat flat to prevent lateral tipping and ribbed to reduce sliding friction. A runner of the general shape of that shown in the drawings adds to the support for dust receptacle 41 and makes it easy to move the cleaner from room to room.

Means are provided within pan 41 whereby particles of foreign matter which are attracted by and adhere to plates 44 to 46 during operation are automatically removed therefrom and brushed into said pan as the latter is removed for emptying. Such means, as shown, are constituted by a plurality of pads 80 made of felt or other suitable material and having areas corresponding to the cross-sectional areas of the compartments between plates 44 to 46 and the base of box 57. Said pads are secured to and held in place by rigid plates 81, the widths of which are less than the widths of the pads and which may be riveted, or otherwise suitably secured, to the side walls of receptacle 41 (Figs. 5 and 6). Thus when pan 41 is moved to the right, as seen in Fig. 1, by means of a handle 82 secured to the end thereof, pads 80 are effective to thoroughly clean the surface of plates 44 to 46 and brush the accumulated dirt into the bottom of pan 41 for disposal in the customary manner.

Figure 3:
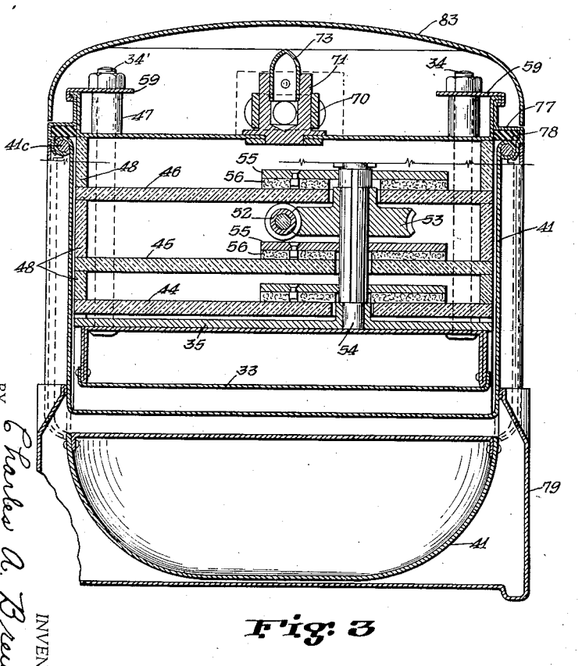
Fig. 3 is an end elevation, partly in section and with parts broken away, the section being taken substantially on line 3—3 of Fig. 1.

In order to cover the moving parts of the above described mechanism, protect separator 65, and add to the general appearance of the cleaning unit, a top cover 83 which may be constituted by a sheet metal stamping is provided. The forward end of said cover fits beneath a flange that projects from the arcuately shaped upper edge of housing member 28, and is supported by partition 61 and a hooked portion 84 (Fig. 1) which is integral with that portion of bracket 77 which extends across the end of box 57. For the greater portion of the length of cover 83 the same is so cut as to provide a passage 85 (Fig. 4) through which air emerging from separator 65 may pass into the room. The side edges of cover 83 adjacent the forward end thereof preferably extend vertically downwardly and rest upon the upper surface of a horizontal ledge portion of bracket 77 (Fig. 3).

Latching means adapted to serve the double purpose of holding both pan 41 and cover 83 in proper positions are provided. In the embodiment of Fig. 1 said means comprise a U-shaped arm 86 which is pivotally mounted on handle 82. The free end of said arm is arcuately shaped for the purpose of engaging a yieldable locking pawl 87 which is slidably mounted in a deformed portion of cover 83. A spring 88 or other suitable resilient means may be provided for yieldingly holding pawl 87 in engagement with said free end of arm 86. When the latter is in locking position, as seen in Fig. 1, it will be apparent that the same is effective to hold the upper edge of pan 41 upwardly in close engagement with rubber strip 78 and to hold said pan against movement to the right, as well as to hold cover 83 against withdrawal from hook 84.

When pan 41 is removed for the purpose of disposing of the dirt accumulated therein, said dirt may, if desired, be emptied by turning the pan on its side or upside down. Preferably, however, a novel pivoted cover is provided on portion 41b at the forward end of the pan whereby the accumulated dirt may be emptied without creating a dust cloud and again scattering the dirt about the premises. In the form shown, said cover comprises a flanged metal plate 89 which is pivoted to the side walls of pan 41 and has a resilient gasket member 90 around the lower periphery thereof adapted to engage the edges of an opening in said pan. Cover 89 is adapted to be held in closed position by a pair of springs 91 which are housed in telescoping cylindrical members 92 and 93, the former of which is pivotally secured to the side walls of pan 41 and the latter of which have the outer ends thereof joined by a rod 94 which extends across the upper surface of cover 89. A sheet metal plate which is deformed to provide a pair of hooked portions 95 and 96 and a handle 97 is secured to the upper surface of cover 89, in such manner that when the latter is in closed position rod 94 is adapted to rest against portion 95. When the cover is raised by pulling upwardly on handle 97, springs 91 are extended and rod 94 slides into contact with hooked portion 96 to hold the cover in open position, as shown in dotted lines in Fig. 5. The holes in the flanges of cover 89 through which the pivot pins therefor extend are preferably elongated as shown at 98 so that springs 91 may be effective to hold gasket 90 in firm engagement with the edges of the opening in pan 41 around the entire periphery of said opening.

A suitable handle may be provided whereby the cleaner unit A may be readily carried from place to place, such as up and down stairs. As shown in Fig. 1, a handle comprising a stiff wire bail 99 and a formed sheet metal member 100 is pivotally secured by means of suitable lugs to housing 17, 19, the center of said handle being located substantially vertically above the center of gravity of the unit. Said handle is adapted to be held in an erect position, as seen in Fig. 1, by a groove 101 into which a vertical portion of bail 99 is adapted to fit and be yieldingly held by a suitable spring 102. The handle may be moved to the right against the pressure spring 102 until the same is clear of groove 101, thereby permitting the same to be pivoted to either side and lay against housing 17. Portion 100 of the handle is formed with a wide curved part 103 adapted to fit comfortably into one's hand and downwardly extending curved portions 104 which engage bail 99 to hold member 100 against movement relative to said bail. It will be noted that the cleaning unit may be constituted in a large degree of light sheet metal stampings and is accordingly light and easy to carry about a home by means of handle 99, 100.

When it is desired to use the above described unit to clean a rug or the like, floor tool 15, 16 may be readily attached thereto by novel means whereby the hose and nozzle constituting the floor tool may be rotated without twisting said hose while attaching the same or during the operation and use of the cleaner. As shown, such means are constituted by a tubular member 105 slideably fitted into cylindrical opening 23 of fan housing 19 and having threads 106 impressed in the walls thereof. The marginal portions of both ends of said tubular member are turned outwardly to form external flanges, the flange at the inner end being adapted to engage the inner wall of housing 19 and the flange at the outer end being adapted to engage a knurled ring 107 which is interposed between said flange and the outer end of opening 23. Ring 107 is preferably secured to member 105 or otherwise held against rotation relative thereto. A threaded tubular member 108 (Fig. 8) is rigidly secured to one end of hose 16 and may be threaded into member 105 by inserting the same therein and rotating said last named member by means of ring 107.

In the operation of the above described apparatus, the fan motor is connected to a suitable source of electric energy by means of an electric cable (not shown) whereby fan 21 is rotated at high speed and becomes effective to draw air and dirt through nozzle 15 which is moved about over the surface to be cleaned. Air thus drawn into housing 19 is driven by the fan through passage 26, 30 into baffle box 33 and thence through the openings in the bottom thereof into pan 41. Due to the decreased velocity, the abrupt changes of course, and whirling motion to which the air currents are subjected in pan 41, most of the dirt particles entrained by the air are caused by the forces of gravitation to settle to the bottom of the pan. The air then passes upwardly following the course indicated by the arrows between plates 44, 45 and 46 which are being continuously charged with static electricity in the manner fully pointed out above. The air continues in its upward path through opening 58 into box 57 thence through separator 65 and out into the room through passage 85. At the same time suction arm 68 is being angularly reciprocated in close contact with separator 65 thereby preventing the adherence of any dust particles to the latter.

Figures 9, 10, 11, 12, 13:
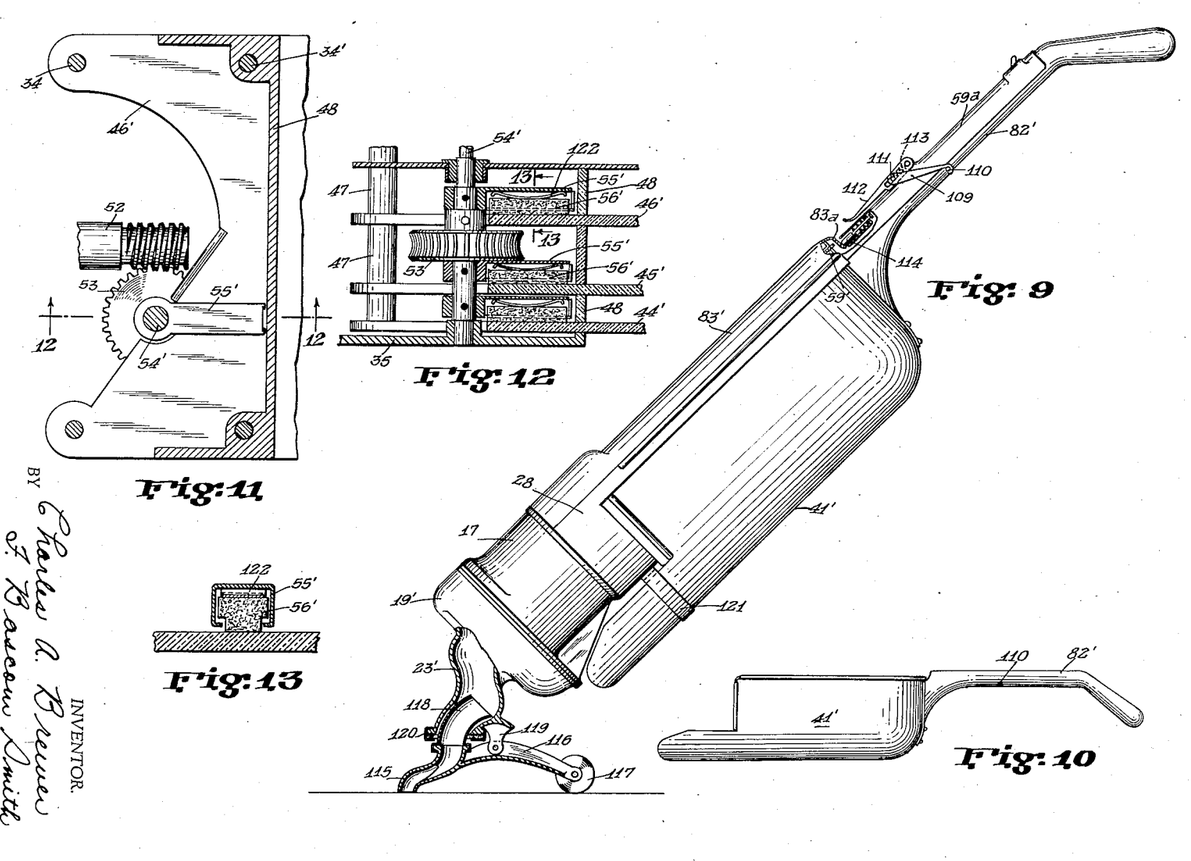
Fig. 9 is a side elevation, partly in section and with parts broken away, of another form of apparatus in which the invention may be incorporated.
Fig. 10 is a detail view on a reduced scale showing the removable dust receptacle of the device of Fig. 9.
Fig. 11 is a detail top plan showing a modification of the static generating means employed in carrying out the invention.
Fig. 12 is a sectional view taken on line 12—12 of Fig. 11.
Fig. 13 is a detail sectional view taken on line 13—13 of Fig. 12.

A modification of the above described vacuum cleaner is illustrated in Figs. 9 and 10 wherein the invention is embodied in a vacuum cleaner which is provided with an attached nozzle, the cleaner being adapted to be moved as a unit during operation in a manner similar to vacuum cleaners commonly known as the Hoover type. Since the great majority of parts of the modified cleaner are identical with parts of the embodiment of Figs. 1 to 8 inclusive, it is not believed to be necessary to again illustrate such parts in detail in Figs. 9 and 10 nor to repeat the description of said parts. Accordingly only those parts which differ in a material respect from those already described will be hereafter touched upon.

In the device of Fig. 9, a dust pan 41' is provided which is similar to pan 41 except that no cover 89 is provided thereon and an elongated handle 82' is provided in lieu of handle 82. Handle 82' is preferably constituted by a sheet metal stamping of U-shaped cross section, the outer end thereof, however, being tubular to form a suitable hand grip. Cover plate 59' corresponding to plate 59 has a rearwardly extending portion 59a which is bent into U-section and adapted to cooperate with handle 82' to form a composite tubular handle by means of which the cleaning unit may be supported and moved about during operation.

Pan 41' is held against removal by means of a toggle latch comprising a hooked arm 109, one end of which is adapted to engage a pin 110 on handle 82'. The other end of arm 109 is provided with a pin 111 which extends into a slot in a second arm 112 that is pivotally mounted on extension 59a, said pin being adapted to slide in said slot against the pressure of a suitable spring 113. Thus, when lever 112 is raised and pivoted beyond a vertical position, hook 109 will be released from pin 110 thereby freeing pan 41' for movement upwardly to the right as seen in Fig. 9. For the purpose of holding cover 83' in position, a tongue 83a thereon is adapted to extend through an opening in plate 59' and operatively engage a spring pressed pawl 114.

In lieu of floor tool 15, 16, the embodiment of Fig. 9 is provided with a laterally elongated nozzle 115 which, as shown, is cast integrally with a carriage 116 having a pair of spaced rollers or wheels 117 thereon, only one of the latter being shown. An arcuate tubular member 118 is secured to the upper end of nozzle 115 and slideably extends into an arcuate tubular portion 23' of fan housing 19' said latter portion communicating with the center or suction chamber of said housing. Carriage 116 is pivotally connected to a depending lug 119 on portion 23' and constitutes a mobile support for the cleaning unit, the pivot being placed at the center curvature of tube 118 so that said unit may be raised and lowered at the will of the operator without moving nozzle 115 out of contact with the surface being cleaned. A sealing or packing ring 120 of any suitable material and having a close fit around tube 118 may be provided in the lower end of extension 23' to form a substantially air-tight connection.

In order to support the upper portion of the cleaner unit above the floor when pan 41 is removed, a rigid U-shaped band 121 may be secured in any desirable manner, such as by means of rivets, to housing member 28. Said band or strap also constitutes an additional support for pan 41' when the latter is in position on the unit.

In Figs. 11 to 13 there is illustrated a modified form of means for creating a static charge on plates 44', 45' and 46', primed numerals in said figures being used to designate parts which differ but are similar or correspond to the parts that are designated by like numerals in the embodiment of Figs. 1 to 8. As seen more clearly in Fig. 11, the forward ends of plates 44' to 46' are bifurcated and friction arm assemblies are substituted for discs 55, 56 of Fig. 1. Each of said arm assemblies, in the form shown, comprises a channel-shaped arm 55', a hub portion of which is pinned or keyed to shaft 54' for rotation therewith. A T-shaped pad 56' of felt or other suitable material is inserted in said arm with the reduced lower end thereof extending outside of the arm and being adapted to contact plate 46', for example. Any suitable resilient means, such as leaf springs 122, are inserted between the upper surface of pad 56' and the upper wall of arm 55' for maintaining the pad in frictional contact with said plate 46'. Preferably the bifurcated ends of plates 44' to 46' are so shaped with respect to shaft 54' that pads 56' will be in contact therewith during only one-half of each complete revolution of arms 55'. If desired, each of the arms 55' may extend in a different direction from shaft 54' in order that the same will engage their respective plates in succession rather than simultaneously as illustrated in the drawings. Shaft 54' is adapted to be rotated by the fan motor through worm 52 and worm gear 53 in the same manner as pointed out in connection with the first embodiment.

There is thus provided a novel method and means for cleaning a gaseous medium, such as air, said method being particularly applicable for removing dust and other foreign particles from the air in a vacuum cleaner of the type employed for cleaning rugs and the like. A novel vacuum cleaner embodying means for carrying out said method is also provided, said vacuum cleaner being very simple in construction and of light weight, thereby lending itself to ready and inexpensive manufacture in large quantities. The light weight of the cleaner unit renders the same particularly adapted for use by the housewife in the home. The air passing through the cleaner is thoroughly cleaned and purified and additionally a maximum efficiency is obtained in the operation of the suction fan thereby increasing the cleaning ability of the unit over other vacuum cleaners having the same size and type of fan and power unit.

Although only a limited number of embodiments and modifications of the invention have been illustrated and described in detail it is to be expressly understood that the same is not limited thereto but that various changes may be made without departing from the spirit and scope of the invention. For example, the air passing through the cleaner may be caused to pass through a perforated separator of any suitable type before being directed over the statically charged surfaces, if desired. Various other changes may also be made in the design, composition and arrangement of parts illustrated, as will now be apparent to those skilled in the art. For a definition of the limits of the invention, reference will be had primarily to the appended claims.

What is claimed is:

1. In gas cleaning apparatus, means for creating a flow of a gaseous medium having particles of foreign matter entrained therewith, an electrified member adapted to attract said particles, flow directing means including a series of baffle plates whereby said medium is subjected to changes of course and reductions in velocity to permit the larger of said particles to be deposited by gravitational forces and thereafter directing said medium over said electrified member, detachable receptacle means adjacent said member, and scraping means operative upon the detaching of said receptacle from said apparatus for removing said attracted particles from said member and depositing the same in said receptacle.

2. In apparatus of the class described, power means for causing a flow of dust-laden gaseous medium, a baffle box adapted for causing sudden changes in the course and speed of said flow and for imparting a rotary motion to portions thereof, a series of baffle surfaces adapted for electrostatic charging, means actuated by said power means for charging said baffles, a perforated separator, means for directing said flow past said baffle surfaces and through said separator, and an angularly reciprocating suction nozzle adjacent said separator.

3. In gas cleaning apparatus, the combination of an electrified substance, means for directing the flow of gaseous medium in proximity to said substance whereby particles of foreign matter suspended in said medium are attracted to the surface of said substance, detachable receptacle means beneath said electrified substance, and scraping means operative upon the detaching of said receptacle from said apparatus for removing said attracted particles from said substances and depositing the same in said receptacle.

4. In apparatus of the class described, the combination of an electro-statically charged member, a baffle box, a perforated member, fan means for creating a flow of a gaseous medium, means for successively directing the flow of said medium through said baffle box, over said charged member and through said perforated member, a suction nozzle adjacent said perforated member having connection with a region of low pressure produced by said fan means, and means for regularly reciprocating said nozzle over said member.

5. In apparatus of the class described, a suction fan, power means for actuating said fan, a manually removable receptacle, electro-statically charged means, means for directing a flow created by said fan over the surface of said charged means, and means carried by said receptacle for engaging the surfaces of said charged means to remove particles of foreign matter from said surfaces and to deposit the same in said receptacle when said receptacle is removed.

CHARLES A. BREWER.